(12) United States Patent
Liang

(10) Patent No.: US 8,113,038 B2
(45) Date of Patent: Feb. 14, 2012

(54) SYSTEMS AND METHODS FOR DETECTING A COATING ON AN ITEM SUCH AS A MAGNETIC HEAD

(75) Inventor: Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 11/614,004

(22) Filed: Dec. 20, 2006

(65) Prior Publication Data
US 2008/0148825 A1  Jun. 26, 2008

(51) Int. Cl.
*G01B 5/28* (2006.01)

(52) U.S. Cl. .......................................... 73/105

(58) Field of Classification Search ............ 73/105
See application file for complete search history.

(56) References Cited

U.S. PATENT DOCUMENTS

| | | | | |
|---|---|---|---|---|
| 3,097,418 A * | 7/1963 | Vallere | ...................... | 29/592.1 |
| 4,675,986 A * | 6/1987 | Yen | ............................ | 29/603.1 |
| 4,816,422 A * | 3/1989 | Yerman et al. | .................. | 438/6 |
| 5,270,895 A * | 12/1993 | Ruigrok et al. | ............ | 360/125.5 |
| 5,815,910 A * | 10/1998 | Park et al. | .................. | 29/603.16 |
| 6,006,593 A * | 12/1999 | Yamanaka | ...................... | 73/105 |
| 6,196,061 B1 * | 3/2001 | Adderton et al. | ............... | 73/105 |
| 6,208,151 B1 * | 3/2001 | Aton et al. | ..................... | 324/691 |
| 6,279,389 B1 * | 8/2001 | Adderton et al. | ............... | 73/105 |
| 6,861,648 B2 * | 3/2005 | Kley | ............................... | 850/20 |
| 6,899,456 B2 * | 5/2005 | Sundaram et al. | ................ | 374/4 |
| 7,009,414 B2 | 3/2006 | Worledge | | |
| 7,045,780 B2 * | 5/2006 | Kley | ............................ | 250/306 |
| 7,109,482 B2 * | 9/2006 | Kley | ............................ | 250/306 |
| 7,135,876 B2 * | 11/2006 | Petersen et al. | ............... | 324/756 |
| 7,256,968 B1 * | 8/2007 | Krinke | ....................... | 360/294.3 |
| 7,260,980 B2 * | 8/2007 | Adams et al. | ................ | 73/31.05 |
| 7,307,436 B2 * | 12/2007 | Petersen et al. | ............... | 324/754 |
| 7,400,474 B2 * | 7/2008 | Biskeborn et al. | ............ | 360/323 |
| 7,461,543 B2 * | 12/2008 | Degertekin | ..................... | 73/105 |
| 7,485,856 B2 * | 2/2009 | Kley | ............................ | 250/306 |
| 7,548,397 B2 * | 6/2009 | Biskeborn et al. | ............ | 360/121 |
| 7,552,625 B2 * | 6/2009 | Degertekin | ..................... | 73/105 |
| 7,748,260 B2 * | 7/2010 | Su et al. | ........................ | 73/105 |
| 2005/0081609 A1 * | 4/2005 | Worledge | ....................... | 73/105 |
| 2005/0264472 A1 * | 12/2005 | Rast | ............................ | 345/30 |
| 2007/0107502 A1 * | 5/2007 | Degertekin | ..................... | 73/105 |
| 2007/0109003 A1 * | 5/2007 | Shi et al. | ...................... | 324/755 |
| 2007/0109681 A1 * | 5/2007 | Biskeborn et al. | ............ | 360/121 |

* cited by examiner

*Primary Examiner* — Hezron E Williams
*Assistant Examiner* — Rodney T Frank
(74) *Attorney, Agent, or Firm* — Zilka-Kotab, PC

(57) ABSTRACT

Systems and methods for detecting presence of a coating on an item such as a magnetic head. Points on a surface of the item are contacted with an electrically conductive object. A determination may be made as to whether an electrical connection is made between the electrically conductive object and one or more of the points on the surface of the item, an extent of an electrical connection made between the electrically conductive object and any of the points on the surface of the item, etc.

20 Claims, 1 Drawing Sheet

SYSTEMS AND METHODS FOR DETECTING A COATING ON AN ITEM SUCH AS A MAGNETIC HEAD

FIELD OF THE INVENTION

The present invention relates to systems and methods for detecting a coating on an object, and more particularly, this invention relates to systems and methods capable of detecting a coating on a magnetic head.

BACKGROUND OF THE INVENTION

Magnetic head-based system have been widely accepted in the computer industry as a cost-effective form of data storage. In a magnetic tape drive system, a magnetic tape containing a multiplicity of laterally positioned data tracks that extend along the length of the tape is drawn across a magnetic read/write transducer, referred to as a magnetic tape head. The magnetic tape heads can record and read data along the length of the magnetic tape surface as relative movement occurs between the heads and the tape.

In magnetic recording systems, the mechanical interaction of the magnetic head and the recording medium is an important factor determining the performance and reliability of the system. Ideally, the head is in contact or near contact with the moving recording medium to optimize read/write processes. The contact at the head/medium interface results in wear which is a major concern affecting performance and lifetime of both head and medium.

Tape heads may have a protective coating on them to protect the read/write elements from wear, corrosion, shorting, poor handling, etc. During the head manufacturing phase, it is preferable, for reliability purposes, to determine whether a head has been properly coated. Similarly, during a head failure analysis or diagnostic analysis, it may also be desirable to determine whether a protective coating remains on the head, and perhaps, if so, the extent that the coating remains.

It would therefore be desirable to have a system or method of detecting whether a head has a protective coating on it. However, because most coatings are only tens of Angstroms thick, detecting such coatings is very difficult. For instance, optical interferometry is unable to resolve the surface of the coating and the underlying head surface. Auger materials analysis is unable to discern whether the top layer of carbon is coming from the environment or the protective coating. Other methods such as nono-indentation, focused ion beam (FIB) analysis, etc., are destructive and not always conclusive.

SUMMARY OF THE INVENTION

A method for detecting presence of a coating on a magnetic head according to one embodiment of the present invention includes contacting multiple points on a surface of a magnetic head with an electrically conductive object, and determining whether an electrical connection is made between the electrically conductive object and one or more of the points on the surface of the magnetic head.

A method for detecting presence of a coating on a magnetic head according to another embodiment of the present invention includes contacting multiple points on a surface of a magnetic head with an electrically conductive object, and determining an extent of an electrical connection made between the electrically conductive object and any of the points on the surface of the magnetic head.

A method of detecting presence of an electrically insulative coating on an electrically conductive surface of an item according to yet another embodiment of the present invention includes contacting multiple points of an item with a stylus of an atomic force microscope, and determining whether an electrical connection is made between an electrically conductive surface of the item and the stylus.

A system for detecting presence of a coating on a magnetic head according to one embodiment of the present invention includes an electrically conductive object for contacting multiple points on a surface of a magnetic head, and a monitoring device for detecting whether an electrical connection is made between the electrically conductive object and one or more of the points on the surface of the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
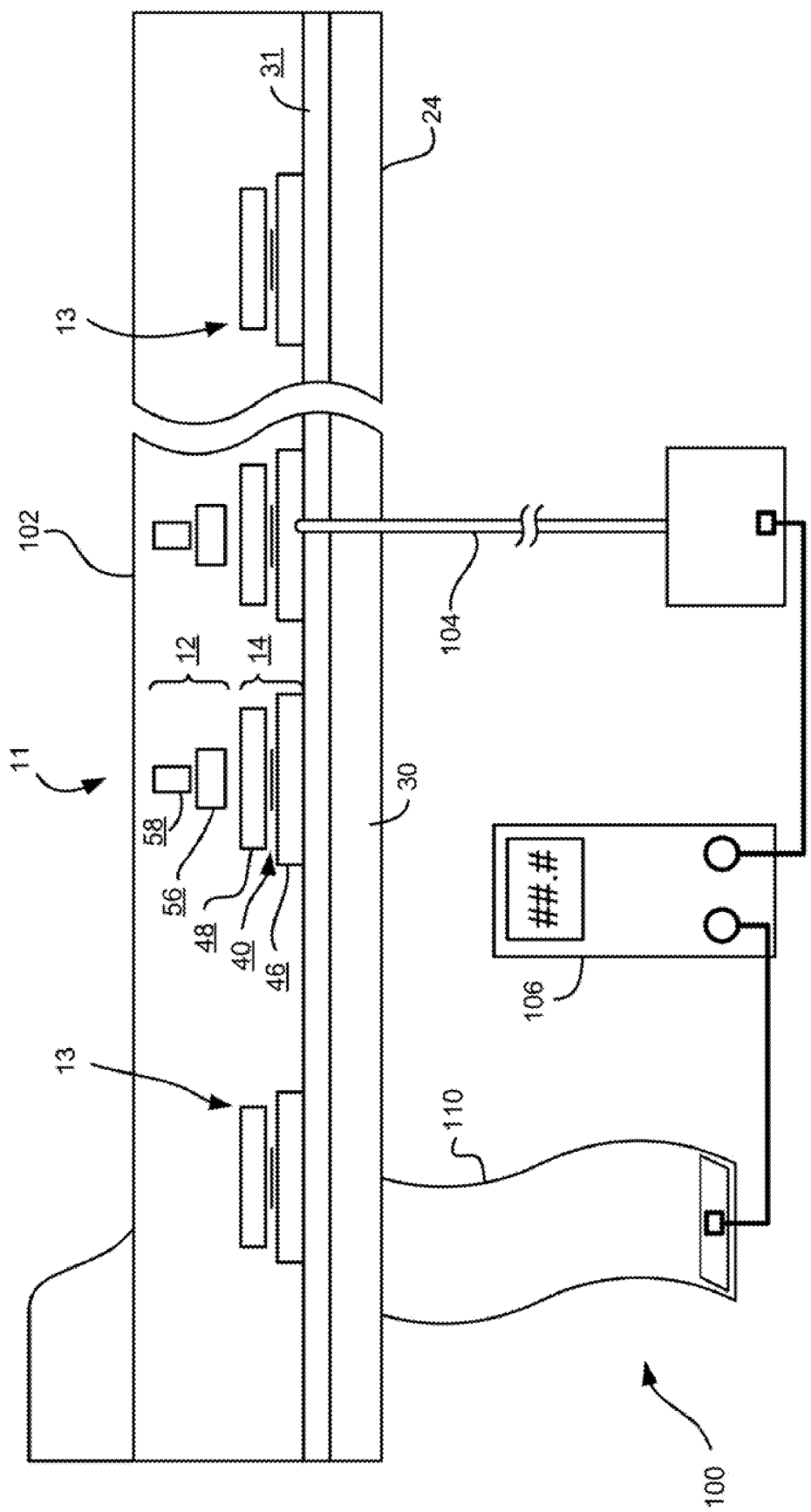
FIG. 1 illustrates a system for detecting presence of a coating on an item such as a magnetic head, according to one embodiment of the present invention.

The following description is the best embodiment presently contemplated for carrying out the present invention. This description is made for the purpose of illustrating the general principles of the present invention and is not meant to limit the inventive concepts claimed herein.

The present description discloses systems and methods for detecting the presence of a coating on an item such as, but not limited to, a magnetic head. In particularly preferred embodiments, the invention includes systems and methods for detecting a protective coating on the reader and servo elements of a magnetic head.

FIG. 1 illustrates a system 100 for detecting presence of a coating on an item 102 such as a magnetic head. As shown, the system 100 includes an electrically conductive object 104 for contacting multiple points on a surface of the item 102, and a monitoring device 106 for detecting whether an electrical connection is made between the electrically conductive object 104 and one or more of the points on the surface of the item 102. In one mode of operation in which the coating is electrically insulative, a current source is coupled to the system or item such that an electrical contact between the surface of the item and the electrically conductive object results in a monitorable flow of current therebetween, indicating absence of the electrically insulative coating.

The item 102 can be any type of item. As will soon become apparent, some embodiments of the present invention allow detection of a coating on very small items and/or across very small areas.

In FIG. 1, the item 102 is a magnetoresistive (MR) head having a plurality of R/W pairs in a piggyback configuration formed on a common substrate 30 and an optional electrically insulative layer 31. The writes, exemplified by the write device 12 and the readers, exemplified by the read device 14, are aligned parallel to a direction of travel of a tape medium thereacross to form a R/W pair, exemplified by the R/W pair 11. Several R/W pairs 11 may be present, such as 8, 16, 32 pairs, etc. The R/W pairs 11 as shown are linearly aligned in a direction generally perpendicular to a direction of tape travel thereacross. However, the pairs may also be aligned diagonally, staggered, in a V-shape, etc. Servo readers 13 are positioned on the outside of the array of R/W pairs, the function of which is well known.

When a module 24 of a piggyback head is constructed, layers are formed on the substrate 30, e.g., of AlTiC, which may be electrically conductive, in general, the following order to form the elements of the R/W pairs 11: an insulating layer 31, a first shield 46 typically of an iron alloy such as NiFe (permalloy), CZT or Al-Fe-Si (Sendust), a sensor 40 for sensing a data track on a magnetic medium, a second shield 48 typically of a nickel-iron alloy (e.g., 80/20 Permalloy), first and second writer poles 56, 58, and a coil (not shown). The first and second writer poles 56, 58 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc. The various devices, e.g., writes and readers, are each typically coupled to a unique pair of pads (not shown). A cable 110 is typically bonded to the pads to allow direct electrical communication with the device via the cable 110.

The types of coatings that can be detected are nearly limitless. An illustrative coating is a partially or fully insulative coating that may overlie a conductive surface of the item. The coating may also be an undesired coating, such as an impurity, a processing artifact, debris deposited during use, etc. On magnetic heads, typical coatings include diamond-like carbon, alumina, etc.

As noted above, an electrical current or voltage is introduced to the system 100 or item 102. For example, an electric current source may be coupled to the electrically conductive object, and an electrical connection of the item, e.g., connection pad of a magnetic head or cable coupled thereto, is monitored for the current. In another embodiment, the current source is coupled to the item, and the electrically conductive object is monitored for the current. In either case, detection of the current by the monitoring device 106 indicates a closed circuit, and thus the absence or insufficient presence of the coating.

The electrically conductive object 104 may take many forms, such as that of a stylus, a finger, a hook, etc. Preferred electrically conductive objects have a relatively fine point so as to allow fine contacting. Rounded points are most preferred so as to avoid damage to the coating. The electrically conductive object may be physically moved or positioned by a human operator or at the operator's direction, may be moved mechanically by an automated system, etc. Note that in some embodiments, multiple electrically conductive objects may be present.

In one illustrative embodiment, the electrically conductive object 104 is a stylus (or portion thereof, e.g., tip) of a stylus profiler. As will be appreciated by those skilled in the art, a stylus profiler is used to map the surface topography of an item. This embodiment of the present invention proposes a new use for the stylus profiler, namely the addition of an electrical connection to the stylus to allow detection of the presence of a coating on an item. In use, the stylus may be swept across the surface of the item, or tapped therealong. In "sweeping" mode, the electrically conductive object remains in contact with the surface of the item when traveling between the points. In "tapping" mode, the electrically conductive object does not remain in contact with the surface of the item when traveling between the points.

In a preferred embodiment, the electrically conductive object 104 is part of an atomic force microscope, which operates on a similar principle to a stylus profiler, except that many atomic force microscopes have a resolution in nanometers. Again, the electrically conductive object may be a stylus or portion thereof, e.g., tip. The stylus is typically mounted to a piezo actuator that rasters the stylus back and forth across the surface. A laser beam bounces off the stylus to detect a height of the tip, thereby allowing mapping of the surface topography.

In one illustrative embodiment for detecting the presence of a coating on a magnetic head using an atomic force microscope in either contact or tapping mode, the reader and servo elements can be electrically probed through the head cable or contact pads and a conductive tip at the air bearing surface. The magnetic head may include multiple readers and writers. In some types of head, the readers and writers are recessed from a tape bearing surface of the magnetic head. In other types of magnetic heads, each reader includes a sensor and at least one shield flanking the sensor, the shield(s) being in electrical communication with the sensor. A shield may be coupled to the sensor to prevent such things as static charging of the shield. The resistance value measured between the conductive tip of the stylus to the contact pad or head cable can be continuously monitored and recorded. For areas where there is a protective coating or areas which are not electrically connected to the cable, an open resistance is measured. However, when the tip scans over the readers and servos, a resistance on the shields and/or elements is detected if the protective coating is not present, or perhaps not sufficiently present. The speed of the scan is relative to the resolution setting of the atomic force microscope; the lower the resolution, the faster the scan. In general, low resolution settings will typically provide adequate detection of the presence of the coating.

Using a stylus profiler or atomic force microscope provides several advantages. For example, one advantage is that a location of at least one of the points on the surface of the magnetic head where an electrical connection is made can be mapped. Particularly, by scanning the surface of the head while monitoring the resistance, a resistance map can be produced. Such a map can be used to determine whether an insulative coating exists and where it is or is not present on the elements or conductive substrate. The resistance map can also be used to diagnose shorting problems due to head tape interface events.

Another advantage of various embodiments of the present invention is that atomic force microscope profiling of the surface of the magnetic head can be performed (when using an atomic force microscope). Any of these "mappings" may be particularly useful when performing a failure analysis.

A further advantages of many of the embodiments disclosed herein is that the detection is highly repeatable. Nor do many embodiments require the presence of a special environment such as a vacuum chamber, etc.

According to one embodiment, the electrically conductive object, e.g., electrical atomic force microscope tip or conductive probe, is rastered or tapped across the surface, and both electrical data and surface topography data are taken simultaneously. This allows for failure analysis of potholes, cracks, and other irregularities in the coating. For instance, a spot of measurable resistance is likely to match up on the topography side with a pothole in the coating.

the monitoring device 106 can be any type of device capable of detecting the electrical connection. Such devices include voltmeters, current meters, ohm meters, etc. The monitoring device 106 can be coupled to both the item and the electrically conductive object. In other embodiments, however, the monitoring device is coupled to either the item or the electrically conductive object, and optionally, ground. The monitoring device 106 may even act as a current source, voltage source, etc.

When analyzing a magnetic head, some or all elements in the head may be shorted and coupled to the monitoring device 106 via a single line. As shown in FIG. 1, multiple electrical contacts of a cable 110 coupled to the item are shorted and coupled to a monitoring device. Along a similar vein, multiple electrical contacts of the magnetic head may be shorted and coupled to a monitoring device. The electrically conductive object may also be coupled to the monitoring device.

To demonstrate how the system of FIG. 1 might work in one embodiment, a method for detecting presence of a coating on a magnetic head includes contacting multiple points on a surface of the magnetic head with an electrically conductive object, and, a determination is made as to whether an electrical connections is made between the electrically conductive object and one or more of the points on the surface of the magnetic head.

In another embodiment, a method for detecting presence of a coating on a magnetic head includes contacting multiple points on a surface of a magnetic head with an electrically conductive object, and determining an extent of an electrical connection made between the electrically conductive object and any of the points on the surface of the magnetic head. The determination of the extent of the electrical connection may include a level of resistance or conductance afforded by the coating, if present. Further, the level of resistance or conductance afforded by the coating at a particular point may be determined in terms of relativity to a predefined resistance or conductance level, or such levels at other points on the surface being contacted.

A method for detecting presence of an electrically insulative coating on an electrically conductive surface of an item in yet another embodiment includes contacting multiple points of an item with a stylus of an atomic force microscope, and determining whether an electrical connection is made between an electrically conductive surface of the item and the stylus.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a monitoring device for determining whether an electrical connection is made between an electrically conductive object and one or more points on a surface of a magnetic head when the electrically conductive object contacts each of the multiple points on the surface of the magnetic head;
   the monitoring device being configured to correlate a lack of an electrical connection with an area of the surface of the magnetic head having a protective coating or which is not electrically connected to a voltage source, current source, the monitoring device, or ground; and
   the monitoring device being configured to map a location of at least one of the multiple points on the surface of the magnetic head where an electrical connection is made.

2. A system as recited in claim 1, further comprising, the electrically conductive object, wherein the electrically conductive object has a single tip, the single tip being the only object contacting the surface of the magnetic head being examined, wherein the single tip of the electrically conductive object travels between the points under control of the monitoring device, wherein the tip of the electrically conductive object remains in contact with the surface of the magnetic head when traveling between the points.

3. A system as recited in claim 1, further comprising the electrically conductive object, wherein the electrically conductive object has a single tip, the single tip being the only object contacting the surface of the magnetic head being examined, wherein the single tip of the electrically conductive object travels between the points under control of the monitoring device, wherein the electrically conductive object does not remain in contact with the surface of the magnetic head when traveling between the points, the electrically conductive object being tapped along the surface of the magnetic head by separating the electrically conductive object from the surface of the magnetic head between the contacting.

4. A system as recited in claim 1, further comprising an atomic force microscope having the electrically conductive object.

5. A system as recited in claim 1, wherein the electrically conductive object has a rounded tip.

6. A system as recited in claim 4, wherein the atomic force microscope performs atomic force microscope profiling of the surface of the magnetic head simultaneously with the mapping.

7. A system as recited in claim 1, wherein the determining whether the electrical connection is made by the monitoring device includes passing an electrical current through the electrically conductive object, and monitoring an electrical connection of the magnetic head for the current.

8. A system as recited in claim 1, wherein the determining whether the electrical connection is made by the monitoring device includes passing an electrical current through the magnetic head, and monitoring the electrically conductive object for the current.

9. A system as recited in claim 1, further comprising the electrically conductive object, wherein the electrically conductive object has a single tip, the single tip being the only object contacting the surface of the magnetic head being examined, wherein the magnetic head includes readers and writers, the readers and writers being recessed from a tape bearing surface of the magnetic head, wherein the electrically conductive object travels between the points under control of the monitoring device, wherein the electrically conductive object does not remain in contact with the surface of the magnetic head when traveling between the points, the electrically conductive object being tapped along the surface of the magnetic head by separating the electrically conductive object from the surface of the magnetic head between the contacting, wherein the determination whether the electrical connection is made includes determining a level of resistance or conductance afforded by a coating on the surface of the magnetic head, wherein the level of resistance or conductance afforded by the coating at a particular one of the points is determined in terms of relativity to a predefined resistance or conductance level, wherein the electrically conductive object has a rounded tip, wherein the monitoring device is configured for coupling to a connection pad of the magnetic head or cable coupled the connection pad of the magnetic head.

10. A system as recited in claim 1, wherein the magnetic head includes a reader, the reader comprising a sensor and at least one shield flanking the sensor, the at least one shield being in electrical communication with the sensor.

11. A system as recited in claim 1, wherein multiple electrical contacts of the magnetic head are shorted and coupled to a monitoring device, the electrically conductive object also being coupled to the monitoring device.

12. A system as recited in claim 1, wherein multiple electrical contacts of a cable coupled to the magnetic head are shorted and coupled to a monitoring device, the electrically conductive object is also coupled to the monitoring device.

13. A system as recited in claim 1, wherein the monitoring device simultaneously performs the mapping and gathering topography data of the surface of the magnetic head.

14. A method, comprising;
sequentially moving to and contacting each of a plurality of points on a surface of a magnetic head with an electrically conductive object; and
determining an extent of an electrical connection made between the electrically conductive object and any of the points on the surface of the magnetic head,
wherein the determination of the extent of the electrical connection includes determining a level of resistance or conductance afforded by a coating on the surface of the magnetic head.

15. A method as recited in claim 14, wherein the electrically conductive object remains in contact with the surface of the magnetic head when traveling between the points, wherein the electrically conductive object has a single tip, the single tip being the only object contacting the surface of the magnetic head being examined.

16. A method as recited in claim 14, wherein the electrically conductive object has a single tip, the single tip being the only object contacting the surface of the magnetic head being examined, wherein the electrically conductive object does not remain in contact with the surface of the magnetic head when traveling between the points, the electrically conductive object being tapped along the surface of the magnetic head by separating the electrically conductive object from the surface of the magnetic head between the contacting.

17. A method as recited in claim 16, wherein the level of resistance or conductance afforded by the coating at a particular one of the points is determined in terms of relativity to a predefined resistance or conductance level, wherein the electrically conductive object has a rounded tip; and further comprising correlating a lack of an electrical connection with an area of the surface of the magnetic head having a protective coating or which is not electrically connected to a voltage source, current source, monitoring device or ground.

18. A system, comprising:
a monitoring device for determining whether an electrical connection is made between an electrically conductive surface of a magnetic head and a single-membered stylus of an atomic force microscope when the stylus contacts multiple points of the magnetic head; and mapping a location of at least one of the multiple points on the surface of the magnetic head where an electrical connection is made,
wherein the electrically conductive object does not remain in contact with the surface of the magnetic head when traveling between the points, the electrically conductive object being sped along the surface of the magnetic head by separating the electrically conductive object from the surface of the magnetic head between the contacting.

19. A system, comprising:
an electrically conductive object for contacting multiple points on a surface of a magnetic head, wherein the electrically conductive object has a single tip, the single tip being the only object contacting the surface of the magnetic head being examined; and
a monitoring device for detecting whether an electrical connection is made between the electrically conductive object and one or more of the points on the surface of the magnetic head; for mapping a location of at least one of the multiple points on the surface of the magnetic head where an electrical connection is made; and for correlating a lack of an electrical connection with an area of the surface of the magnetic head having a protective coating or which is not electrically connected to a voltage source, current source, monitoring device or ground.

20. A system as recited in claim 19, wherein the electrically conductive object is part of an atomic force microscope, wherein the monitoring device determines an extent of an electrical connection made between the electrically conductive object and any of the points on the surface of the magnetic head, wherein the determination of the extent of the electrical connection includes determining a level of resistance or conductance afforded by a coating on the surface of the magnetic head, wherein the electrically conductive object is tapped along the surface of the magnetic head by separating the electrically conductive object from the surface of the magnetic head between the contacting, wherein the monitoring device is configured for coupling to a connection pad of the magnetic head or cable coupled the connection pad.

* * * * *